(12) United States Patent
Reial (10) Patent No.: US 7,142,586 B2
(45) Date of Patent: Nov. 28, 2006

(54) ROBUST DELAY ESTIMATION ARCHITECTURE

(75) Inventor: Andres Reial, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 789 days.

(21) Appl. No.: 10/246,873

(22) Filed: Sep. 18, 2002

(65) Prior Publication Data

US 2004/0052304 A1 Mar. 18, 2004

(51) Int. Cl.
*H04B 1/707* (2006.01)
(52) U.S. Cl. .............. 375/148; 375/343; 375/150
(58) Field of Classification Search ............. 375/148, 375/150, 227, 140, 147, 317, 149, 152, 144, 375/343; 370/335, 342; 536/23.1; 455/424, 455/67.11, 456.1
See application file for complete search history.

(56) References Cited

U.S. PATENT DOCUMENTS

| | | | | |
|---|---|---|---|---|
| 6,229,842 B1 * | 5/2001 | Schulist et al. | ............. | 375/148 |
| 6,496,494 B1 * | 12/2002 | Perrin et al. | ................. | 370/335 |
| 6,650,694 B1 * | 11/2003 | Brown et al. | ................ | 375/150 |
| 6,724,834 B1 * | 4/2004 | Garrett et al. | .............. | 375/317 |
| 6,754,255 B1 * | 6/2004 | Yano et al. | ................. | 375/149 |
| 6,907,049 B1 * | 6/2005 | Tamura | ...................... | 370/479 |
| 7,072,381 B1 * | 7/2006 | Atarashi et al. | ............ | 375/144 |

| | | | |
|---|---|---|---|
| 2004/0132443 A1 * | 7/2004 | Klein et al. | ................. 455/424 |

FOREIGN PATENT DOCUMENTS

| | | |
|---|---|---|
| EP | 0 989 685 A2 | 3/2000 |
| EP | 1 033 823 A1 | 9/2000 |
| EP | 1 052 783 A2 | 11/2000 |
| EP | 1 067 700 A2 | 1/2001 |
| EP | 1 089 476 A1 | 4/2001 |
| WO | 99/57819 | 11/1999 |
| WO | 99/63677 | 12/1999 |

OTHER PUBLICATIONS

Amadei, D., Standard Search Report prepared by European Patent Office, May 8, 2003 (4 pgs.).
Dong-Hajk Lee et al; "*A Wideband DS-CDMA Cell Site Modem*"; Apr. 2001; IEIC Trans. Commun., vol. E84-B; pp. 984-991.
Amadei, D. International Search Report completed Feb. 11, 2004, (4 pages).

* cited by examiner

*Primary Examiner*—Temesghen Ghebretinsae (57) ABSTRACT

In a robust delay estimator system and method, an average PDP buffer serves as a source of reliable control information to other stages of the delay estimator. The PDP output from every path searcher and tuning finger pass is accumulated in the average PDP buffer, which maintains average PDP estimates for the whole allowable delay spread range. The current (i.e., instantaneous) PDP estimate is then added to the average PDP using an exponential averaging method. The average PDP buffer stores the current PDP estimate and the average PDP estimate, as well as timing and other types of information regarding the estimates. The information in the average PDP provides the necessary information for, and is used to control the operation of, all the individual sub-stages of the delay estimation process.

15 Claims, 4 Drawing Sheets

ROBUST DELAY ESTIMATION ARCHITECTURE

BACKGROUND OF THE INVENTION

1. Field of the Invention

This invention relates to multipath delay estimation in wireless communication systems and, in particular, to a more robust and flexible method and system of estimating multipath delays.

2. Description of the Related Art

In code division multiple access (CDMA) and wideband CDMA (WCDMA) mobile communication systems, such as the Universal Mobile Telecommunication System (UMTS), data is transmitted using a spread spectrum modulation technique wherein the data is scattered across a wide range of frequencies. Each channel is assigned a unique spreading code that is used to spread the data across the frequency range. The spreading code is called a pseudo-random noise (PN) code and is composed of a binary sequence of 1's and 0's (or 1's and −1's), called "chips," that are distributed in a pseudo-random manner and have noise-like properties. The number of chips used to spread one data bit, or chips/bit, may vary and depends, in part, on the data rate of the traffic channel and the chip rate of the system. To recover the transmitted data, the received signal must be despread with the same spreading code using the same chip rate. Furthermore, the timing of the demodulation must be synchronized, that is, the despreading code must be applied to the received signal at the correct instant in time.

Figure 1:
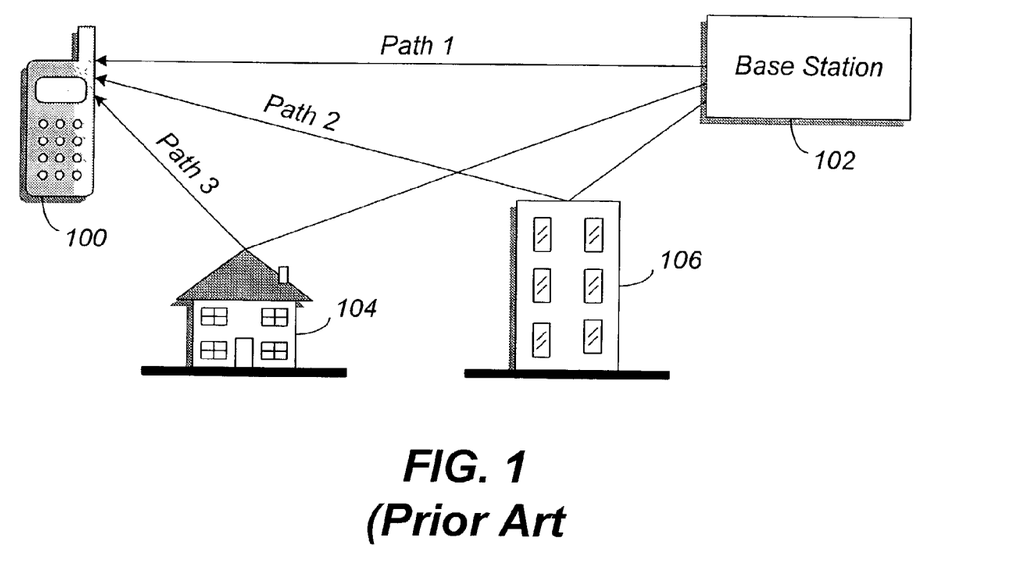
FIG. 1 illustrates various exemplary multipath propagation paths.

Achieving the proper timing can be difficult due to multipath fading effects where the same transmitted signal travels along multiple paths to arrive at the receiver unit at different times. Referring to FIG. 1, for example, the receiver unit 100 may receive the transmitted signal from a base station 102 on a direct and unobstructed propagation path (Path 1). However, many other propagation paths (e.g., Path 2, Path 3) also exist because, in most cases, the transmit antenna of the base station 102 is not focused narrowly enough in any given direction. Thus, multiple instances of the same signal may be received by the receiver unit 100 at different times as portions of signal are reflected off various objects and obstacles (e.g., a house 104, a building 106) in the surroundings before arriving at the receiver unit 100. In the reverse direction, transmission from the receiver unit 100 to the base station 102 may experience similar multipath fading effects.

Most CDMA based systems use RAKE receivers that are capable of identifying and tracking the various multipath signals for a given channel. Multipath signals with similar propagation distances may then be combined, depending on the time resolution of the transmission system and the instantaneous phase relationship of the multipath signals, to form a distinct multipath component. Each multipath component is assigned a despreader (RAKE finger) that has a copy of the spreading code, but which copy has been delayed in time relative to the spreading code used for the direct path component. The amount of delay time in the despreader is set to match the path delay of the corresponding multipath component. After despreading, the multipath components from the various despreaders are coherently combined to produce an estimate of the data or symbols being transmitted.

For the above arrangement to be effective, the RAKE receiver requires up-to-date knowledge of the multipath delays of the channel. This knowledge is important in order to maximize the signal-to-interference ratio of the detected multipath signal. In addition, the smaller the number of paths available at the receiver unit, the larger the probability that the detected paths may experience simultaneous deep fade. The utilization of diversity, or lack thereof, may lead to serious and often catastrophic degradation of the block error rate (BLER).

One way to identify the multipath signals is to search for the multiple paths over a range of possible despreading delays. This path searching can be obtained by transmitting a pilot signal from the base station and applying a series of predefined despreading delays at the receiver unit. Where the predefined delays happen to coincide with the arrival times of the multipath signals, a larger-magnitude channel estimate will result. The resulting delay profile, which can be a complex delay profile (CDP) or a power delay profile (PDP), may then be subjected to peak detection, and the location of the peaks are reported to the RAKE receiver as estimates of the multipath delays of the channel.

Figure 2:
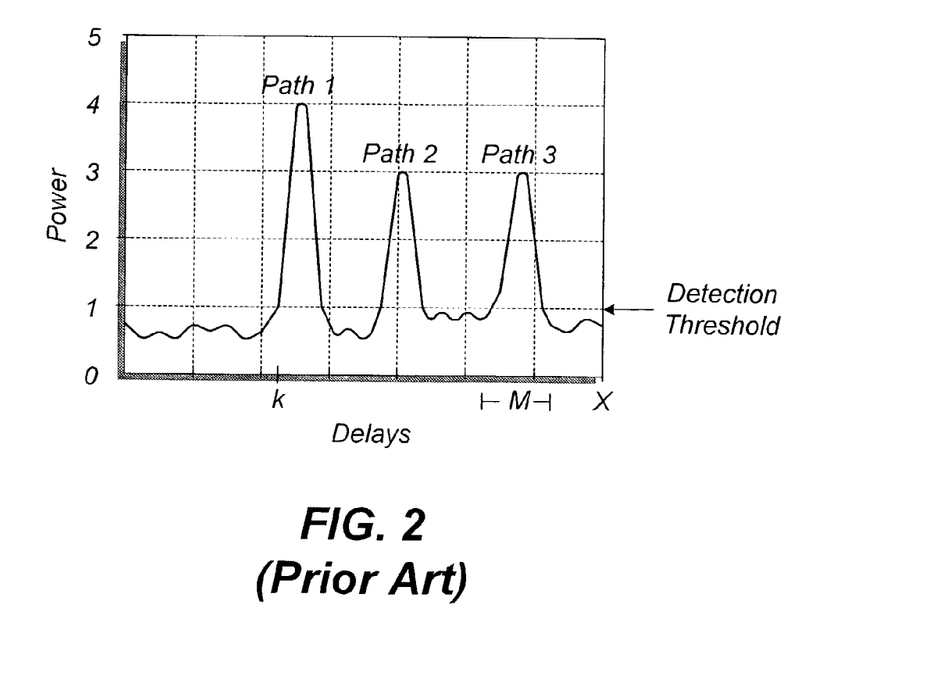
FIG. 2 illustrates an exemplary power delay profile and channel impulse response for a given channel.

FIG. 2 illustrates an exemplary PDP of a given channel for one pass or iteration of the path search. The vertical axis in FIG. 2 represents the magnitude of the detected signal, while the horizontal axis represents the size of the delays applied. The PDP of FIG. 2 shows all the signals that are received by the receiver unit, including noise and interference signals. However, only the peaks in the PDP correspond to the multipath signals of the channel, which peaks together form the impulse response of the channel. In this iteration, the search window (or delay spread) includes a total of X number of delay units. One delay unit may be, for example, 0.1 μs, and k delay units is simply k times one delay unit. In subsequent iterations or passes, the search window may be adjusted both in position (i.e., starting time) and size (i.e., number of delay units) in order to continually update the RAKE receiver with the most recent multipath delay estimates.

However, the processing and power consumption expenses of frequently executing this path searching routine is usually prohibitive. Therefore, typical delay estimations use shortened search windows, reduced searcher resolution, and additional, short sub-searcher routines to produce higher resolution estimates of certain areas of the PDP, for example, the M delays indicated in FIG. 2. Even with these reduction measures, it has been found that the task of properly scheduling the searcher passes and positioning the search window can still pose serious difficulties under many channel conditions. Consequently, some multipath components escape detection, thereby degrading both the instantaneous SIR (signal-to-interference ratio) and the utilized diversity in the multipath fading environment.

Figure 3:
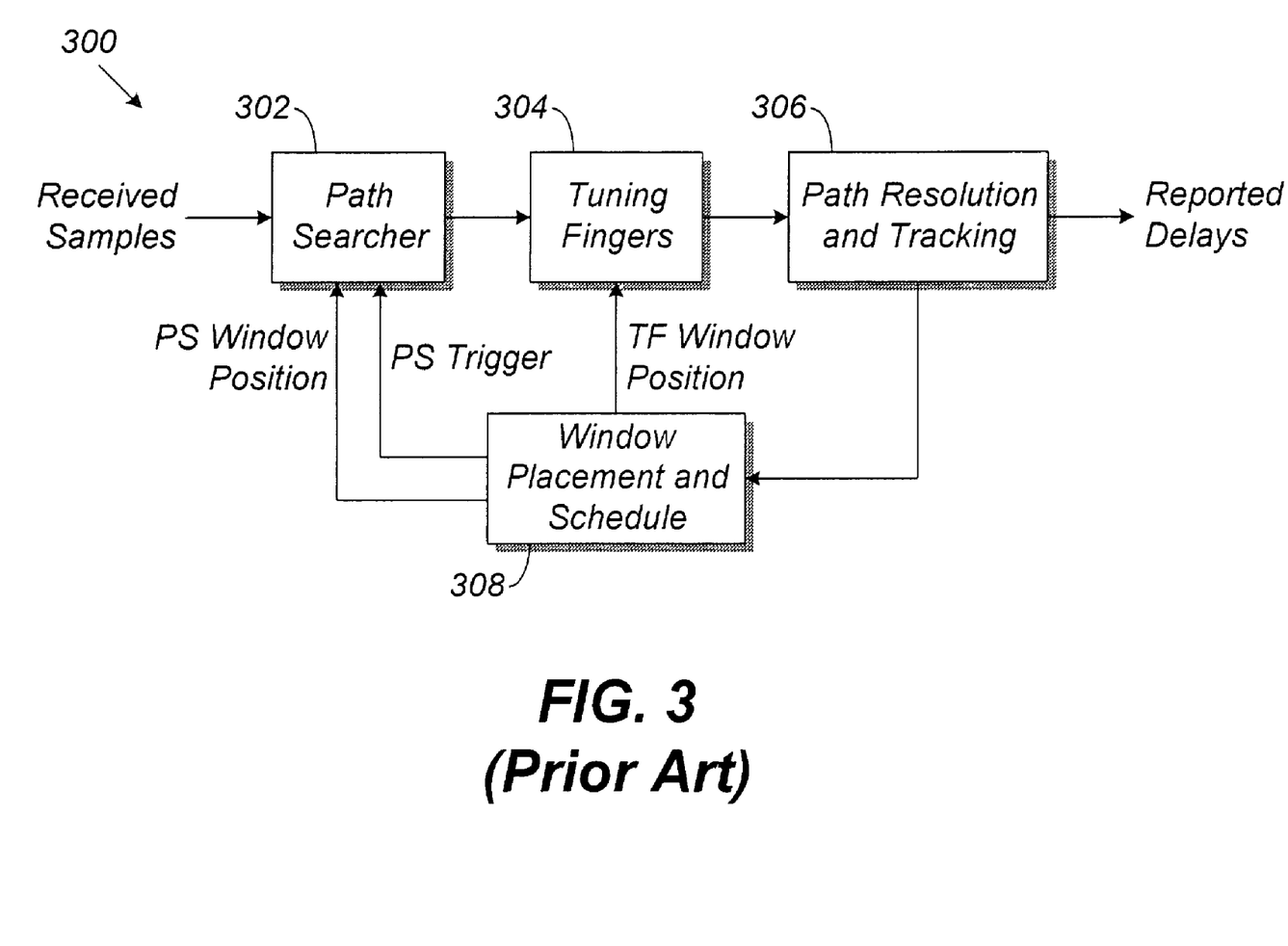
FIG. 3 illustrates a prior art multipath delay estimation system.

Since the realization of the delay estimation function in RAKE receivers depends on the specific system parameters and hardware resources, it is difficult to present a universally "best" solution that may be applied to all systems. For example, although there exist a number of basic architectures for delay estimation, there are even more numerous detailed variations thereof. Nevertheless, a fairly advanced and practical implementation of a delay estimator can be said to include the following stages: path searcher, tuning fingers, path resolution and tracking, and searcher window placement and scheduling FIG. 3 illustrates a basic delay estimator in a RAKE receiver. As can be seen, the delay estimator 300 includes a path searcher (PS) 302, tuning fingers (TF) 304, a path resolution and tracking module 306, and a searcher window placement and scheduling module 308, all interconnected as shown. The path searcher 302 is a device that computes instantaneous channel impulse response estimates (complex or power) over a range of delays that constitutes a significant fraction of the maximum delay spread allowed by the system. The CDP or PDP for a given delay value is estimated by correlating the received data for the pilot symbols with an appropriately delayed copy of the spreading sequence, a method which is well known in the art. Often, the path searcher 302 is used mainly as a means to detect the existence of paths and, therefore, its output resolution may be somewhat lower than the resolution required by the RAKE receiver.

Tuning fingers 304 are devices for producing a high-resolution instantaneous CDP or PDP over a narrow delay window, for example, the M delays in FIG. 2. The tuning fingers 304 may include M despreaders, each despreader tuned to one of the M neighboring delays. The despreaders of the tuning fingers 304 are similar to the despreaders of the RAKE fingers of the path searcher except they are usually more closely spaced together. Because of the high resolution, tuning fingers 304 are commonly used to locally refine the coarser PDP information provided by the path searchers 302.

The path resolution and tracking module 306 includes a set of signal processing and logical algorithms that extract the physical path location information from the path searcher 302 and the tuning fingers 304 outputs. This location information is then presented as delay estimates to subsequent RAKE receiver stages, and assignment of distinct paths to RAKE fingers is made. Once assigned, the assignments remain constant over a significant time to allow reliable power and interference estimation. The degree of complexity of the signal processing and logical algorithms varies significantly depending on system parameters, and may range from simple peak detection to sophisticated deconvolution and filtering algorithms.

The scheduling and window placement module 308 includes control logic that determines the timing of the path searcher and tuning finger activation and their respective window positions for each path searcher cycle. The timing of the activation may be fixed (periodic), or it may depend on signals derived from the surrounding environment, while the positioning usually depends on the location of previously detected paths.

The nature of the delay estimates provided by the delay estimator 300 shown in FIG. 3 is intrinsically instantaneous in that, for a simple implementation, a particular step can be performed based only on the information provided by the previous stage. However, it is often found that such memoryless operations do not yield satisfactory results under certain demanding channel conditions. In low signal-to-interference ratio (SIR) conditions, for example, the peaks in the PDP due to the physical paths are difficult to distinguish instantaneously. Fading effects also make it difficult to detect and track paths based merely on the instantaneous path magnitude at the time of the path searcher pass. Further, for channels with wide delay spread, the precise path searcher window placement is critical to avoid missing paths with significant energy.

One way to alleviate the above concerns is to build some temporal averaging (filtering) into certain points of the path detection and control logic stages (e.g., the path resolution and tracking stage). It has been found, though, that successful performance of the delay estimator at the system level is quite sensitive to finding the proper combinations of filtering parameters. These parameters, in turn, often depend on a particular targeted channel condition. Accordingly, it is desirable to provide a more robust delay estimator architecture that is less susceptible to the difficult channel conditions mentioned above.

SUMMARY OF THE INVENTION

The present invention is directed to a robust delay estimator system and method. In some embodiments, the delay estimator system and method includes an average PDP buffer (APB) that serves as a source of reliable control information to other stages of the delay estimator. The PDP output from every path searcher and tuning finger pass is accumulated in the average PDP buffer, which maintains average PDP estimates for the whole allowable delay spread range. The current (i.e., instantaneous) PDP is then added to the average PDP, for example, using an exponential averaging method. The average PDP buffer stores the average PDP estimate, as well as timing and other types of information regarding the estimates. The information in the average PDP provides the necessary information for, and is used to control the operation of, all the individual sub-stages of the delay estimation process.

In general, in one aspect, the invention is related to a multipath delay estimator for use in a spread spectrum based mobile communication system. The multipath delay estimator comprises a path searcher module capable of obtaining channel estimates for a channel at each one of a plurality of delays. The path searcher module is configured to compile a current delay profile for the channel based on the channel estimates. The multipath delay estimator further comprises an averaging module connected to the path searcher module. The averaging module is configured to calculate an average delay profile for the channel using the current delay profile and one or more previous delay profiles. The multipath delay estimator further comprises a delay profile buffer connected to the averaging module and adapted to store information regarding the current delay profile and the average delay profile. A peak detector module is connected to the delay profile buffer and is configured to detect peaks in the average delay profile and to track the peaks over time.

In general, in another aspect, the invention is related to a method of estimating multipath delays for a channel in a spread spectrum based mobile communication system. The method comprises the steps of defining a set of available despreading delays for the channel, initiating a path search of the channel using the delays to obtain channel estimates for the channel at each delay, and compiling a current delay profile for the channel based on the channel estimates. The method further comprises calculating an average delay profile for the channel using the current delay profile and one or more previous delay profiles. The peaks in the average delay profile are then detected and tracked over time.

It should be emphasized that the term comprises/comprising, when used in this specification, is taken to specify the presence of stated features, integers, steps, or components, but does not preclude the presence or addition of one or more other features, integers, steps, components, or groups thereof.

BRIEF DESCRIPTION OF THE DRAWINGS

A more detailed understanding of the method and system of the present invention may be had by reference to the following detailed description when taken in conjunction with the drawings, wherein.

DETAILED DESCRIPTION OF THE INVENTION

Following is a detailed description of the drawings wherein reference numerals for the same or similar elements are carried forward. For economy of the description, the invention will be described with respect to a power delay profile (PDP). It should be noted, however, that the invention is equally applicable to both PDP and complex delay profiles (CDP).

Embodiments of the invention provide a robust method and system for estimating multipath delays in a mobile communication system. In some embodiments, the PDP estimate from each path searcher and tuning finger pass is added into an average PDP estimate accumulated from previous passes. A buffer is used to store the average PDP estimate, as well as timing and other types of information regarding the estimates, including the timing of the previous update for each delay value in the search window. The average PDP buffer thereafter serves as a reliable source of control information to the other stages of the delay estimation function, including peak detection, tuning finger activation, path searcher activation, and search window positioning. Such an arrangement facilitates long-term tracking of multipath components even across temporary fading of the multipath signals, thereby allowing more accurate interference and power estimations.

Figure 4:
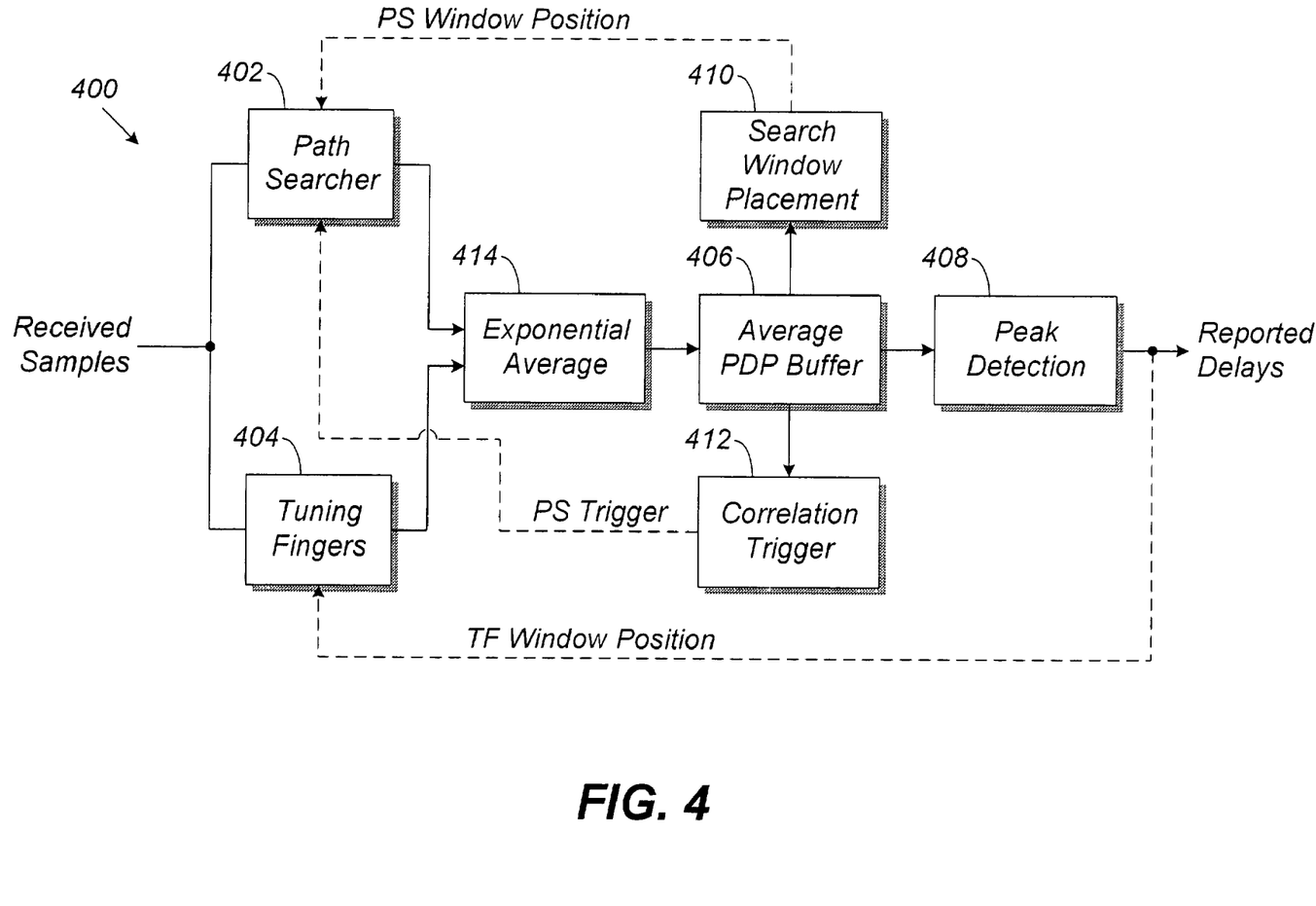
FIG. 4 illustrates a multipath delay estimation system according to embodiments of the invention.

Referring now to FIG. 4, an exemplary delay estimation system according to some embodiments of the invention is illustrated using functional block diagrams. The delay estimation system 400 includes a path searcher module 402, a tuning fingers module 404, and an average PDP buffer 406. The average PDP buffer contains a PDP estimate of where the true path positions are discernible, even when a path is temporarily faded due to, for example, minor movement of the receiver unit or changes in the surrounding environment. The task of the path searcher module 402 is to discover new activity not currently reflected in the average PDP buffer, and the task of the tuning fingers module 404 is to provide PDP estimate updates for the regions where presently detected paths exist based on the prior searches of the path searcher module. The average PDP buffer 406 is then used to provide a number of logical support functions for performing the multipath delay estimations.

One of these delay estimation support functions involves reporting the delay estimations to the RAKE receiver unit (not expressly shown). In some embodiments, delay estimation reporting is performed directly from the average PDP buffer by using a peak detection module 408 to detect peaks in the average PDP stored in the average PDP buffer. The detected peaks are then reported as areas where a multipath component exists. The peak detection module 408 also uses the average PDP buffer to provide path tracking or mapping of a particular path to a specific peak position in the reported list of peaks.

Another delay estimation support function involves placement or positioning of the path searcher window in time. In some embodiments, the path searcher window placement is controlled by a center of gravity calculation module 410 using the information stored in the average PDP buffer. More specifically, the center of gravity calculation module 410 computes the center of gravity COG (see Equation (3) below) of the average PDP stored in the average PDP buffer This center of gravity may then be used to control the placement of the path searcher window. For example, the path searcher window may be adjusted forward or backward in time so as to keep the center of gravity of the average PDP near to the center of the path searcher window. Such an arrangement gives the path searcher window the maximum likelihood of capturing all significant multipath components.

Although the above exemplary embodiment employs center of gravity calculations, the particular window placement algorithms used is not critical to the practice of the invention. Other algorithms based on, for example, the energy captured from the PDP may also be used without departing from the scope of the invention.

Yet another delay estimation support function involves placement or positioning of the tuning finger window in time. In some embodiments, the tuning finger window placement is controlled by the peak detection module 408 based on the peaks detected in average PDP stored in the average PDP buffer. As alluded to previously, the tuning finger window may be used to hone in on regions of the PDP estimate where a multipath component appears to exist. More specifically, certain peaks that are detected based on the average PDP are assigned to one of several tuning fingers in the RAKE receiver. The tuning finger thereafter initiates a high resolution path search on the region in order to more accurately estimate the PDP in that region.

Yet another delay estimation support function involves the unscheduled activation or initiation of the path searcher. An unscheduled path search is initiated when a certain threshold event or events occur, and the PDP estimate needs to be updated with the most recent delay estimates. For example, the PDP estimate may need to be updated if a sudden and rapid reduction in the instantaneous PDP-to-average PDP correlation occurs below a certain threshold. In some embodiments, detection of the threshold event is accomplished by a correlation trigger module 412 using the average PDP stored in the average PDP buffer. The correlation trigger module 412 performs a correlation between the current (i.e., instantaneous) PDP estimate and the average PDP to determine if there are any sudden changes in the multipath environment. If the correlation trigger module 412 detects a threshold event, it sends a signal to the path searcher module 402 to initiate a path search for the purpose of updating the PDP estimate. Such an unscheduled path search activation scheme allows the frequency of regularly scheduled path searches to be reduced without degrading the accuracy of the PDP estimates.

An averaging module 414 performs the task of adding the current PDP estimate to the average PDP. In some embodiments, the averaging module 414 uses a weighted or exponential averaging function to add the current PDP estimate to the average PDP Such an exponential average has an advantage in that more recent PDP estimates are given more weight in the average PDP in order to reflect the present multipath environment, while maintaining the memory of the temporarily faded multipath signals. In some embodiments, the average PDP includes estimates for the whole allowable delay spread range. Furthermore, in some embodiments, the averaging constant can be adjusted to match the channel variation rate. The averaging constant, as will be described below, controls the rate at which the effect of historical data are removed from the average PDP estimate. Operation of the averaging module 414 will now be explained.

Let the estimate of the current PDP for a delay k at a slot l be $$a_k^{(l)}.$$

The slot l may be a transmit interval such as the power control slot in WCDMA. The instantaneous PDP $$a_k^{(l)}$$

may be computed, for example, by correlating the received pilot symbols with the relevant spreading sequence that is delayed by k delay units. Correlating may employ, for example, coherent and/or non-coherent accumulation over several pilot symbols or slots. This method of estimating the PDP is well known in the art and will not be described here.

Let the average PDP estimate for delay k at slot l be $$g_k^{(l)},$$

and assume that the last update of this delay occurred at slot $L_k$. The average PDP may be updated with the current (i.e., instantaneous) PDP estimate according to the following equation:

$$g_k^{(l)} = \phi^{l-L_k} \cdot g_k^{(l-1)} + (1 - \phi^{l-L_k}) \cdot a_k^{(l)} \quad (1)$$

where φ represents the averaging constant. In some embodiments, as alluded to above, the averaging constant Φ may be an exponential time constant of $N_d$ slots, where $N_d$ should be set sufficiently long to incorporate several fading cycles. Note, however, that shorter values of $N_d$ give faster response time when sudden channel changes occur. Ideally, a Doppler estimate describing the channel variation rate may be used to adjust $N_d$ to fit the channel. In any case, the equation for φ can be expressed as:

$$\phi = e^{-\frac{1}{N_d}} \quad (2)$$

When no instantaneous PDP estimate $$a_k^{(l)}$$

is available for a delay k, then the average PDP may be expressed from Equation (1) as $$g_k^{(l)} = g_k^{(l-1)}.$$

On the other hand, if $$a_k^{(l)}$$

exists, but $$g_k^{(l)}$$

has not yet been initialized, then the average PDP may be expressed as $$g_k^{(l)} = a_k^{(l)}.$$

Note that, in a preferred embodiment, the average PDP information $$g_k^{(l)}$$

is maintained over the whole range of possible path delays. In an alternative embodiment, the average PDP information $$g_k^{(l)}$$

is maintained only for regions of the PDP where there are paths currently present.

The average PDP may thereafter be used as a source of PDP estimate for the other delay estimation support functions. For example, in some embodiments, the center of gravity calculation module 410 may determine the path searcher window placement based on the average PDP, $$g_k^{(l)},$$

as follows:

$$COG^{(l)} = \frac{\sum_j j \cdot T_j^{(l)}}{\sum_j T_j^{(l)}} \quad (3)$$

where j represents one chip, $$T_k^{(l)}$$

is a predefined thresholded PDP (defined below), and the center of gravity is given in terms of chips. Furthermore, for each chip j, the delay position of the maximum PDP value within the chip is determined as follows:

$$m(j) = \arg \max_j g_j^{(l)}, \ j \in [n_o j \ ... \ n_o j + n_o - 1] \quad (4)$$

where $n_o$ is the oversampling rate. Therefore, for window placement determination, only one chip will be included in the center of gravity calculation. From Equation (4), $$T_k^{(l)}$$

can be expressed as follows:

$$T_k = \begin{cases} g_{m(j)}^{(l)}, & g_{m(j)}^{(l)} > \max[\beta_1(\max_k g_k^{(l)}), \beta_2 I_0] \\ 0, & \text{else} \end{cases} \quad (5)$$

where $\beta_1$ and $\beta_2$ are system dependent threshold values (perhaps chosen heuristically, e.g., $\beta_1$=0.1 and $\beta_2$=2), and $I_o$ denotes the estimated mean interference power. The $I_o$ term can be computed, for example, using the interference estimates provided by the RAKE fingers. Thresholding reduces the biasing effect from interference-induced entries in the average PDP, $$g_k^{(l)}$$

Thus, for window placement determination, the delay for the j-th chip is only included in the center of gravity calculation if its PDP value is sufficiently large (e.g., at least 0.1x) compared to the maximum PDP value over the whole PDP, and is significantly larger than the interference-induced noise floor.

Given the calculated center of gravity, the path search window may be placed so that most of the channel power would be captured by the window. For example, the window may be placed so that ⅓ of the window length is before the center of gravity value. To detect activity outside the nominal search region, the path search window may be periodically placed outside the boundaries suggested by the center of gravity.

In some embodiments, the average PDP may also be used by the peak detection module 408 to identify the existence of multipath components. Because the average PDP buffer is preferably averaged at a time scale slower than the fading rate, but much faster than the physical path movement (delay variation), the contents of the average PDP buffer can be used to estimate the individual path delays. For example, a desired path delay may be estimated as the location of the maximum average PDP. Thus, for each desired path delay $$t_n^{(l)}$$

at slot l, $$g_k^{(l)}$$

is peak-detected, and the location of the peak can be expressed as follows:

$$t_n^{(l)} = \arg \max_k g_k^{(l)} \quad (6)$$

In some embodiments, a threshold condition (see FIG. 2) is imposed, for example, requiring that $$g_{t_n^{(l)}}^{(l)} > \beta g_{t_1^{(l)}}^{(l)}$$

(where the thresholding value, $\beta$, may be determined heuristically). Requiring that the power from the n-th reported path at slot l is at least equal to a certain fraction of the power of the first path can reduce contributions from noise and/or pulse shape sidelobes. A region around $$t_n^{(l)}$$

corresponding to a minimal path spacing constraint, for example, one chip, is then excluded from further peak detection operations by setting $$g_k^{(l)} = 0 \text{ for } k = t_n^{(l)} - M/2 \ ... \ t_n^{(l)} + M/2.$$

Then, the peak detection cycle using Equation (6) repeats until the required $N_r$ of delays $$t_n^{(l)}$$

have been reported (i.e., n=1 . . . $N_r$). By adding a simple position book-keeping algorithm whereby a particular delay is reported in a consistent position in the list of delays, this ordering method automatically accomplishes the tracking task, since, for true paths, the peaks remain present in the average PDP buffer for an extended time.

In some embodiments, the average PDP may also be used by the peak detection module 408 to place the tuning fingers. For example, let $N_f$ represent the number of tuning fingers. Then, two types of information is used to place the $N_f$ tuning fingers at slot l. First, the delays $$t_n^{(l-1)},$$

where n=1 . . . $N_r$, reported at the (l-1)-th slot, are chosen as window center points. A temporary buffer of permissible PDP positions $v_k$ maintained, where initially $$v_k = g_k^{(l)}.$$

Whenever a tuning finger window of width M is assigned, the surrounding region is cleared:

$$(v_k = 0) \text{ for } k = t_n^{(l)} - M/2 \ldots t_n^{(l)} + M/2.$$

This step ensures that the regions with presumably good properties will be properly updated in $$g_k^{(l)}$$

and considered for reporting in the current slot, and that no overlapping fingers are placed in close proximity.

The remaining $N_f$-$N_r$ tuning fingers are then placed at locations determined by the average PDP data. For each finger, $v_k$ is peak-detected and a tuning finger window is centered at the position of the peak. Again, the surrounding region in $v_k$ is cleared to avoid overlaps when the PDP estimates in the tuning finger windows are computed. This part of the process provides a mechanism to re-capture paths that have faded, but have not disappeared from the average PDP.

In some embodiments, the average PDP may also be used by the correlation trigger module 412 to detect threshold events. The detection of the threshold events may then be used to initiate an unscheduled path search in order to update the PDP estimate. This detection may be done by performing a correlation between the current PDP estimate and the average PDP, as follows. Denote the full set of delay positions covered by the tuning finger in slot l by $D_l$. The $N_f$ tuning fingers, each with window length M (i.e, M delay units, see FIG. 2), then produce an instantaneous PDP estimate, $$b_k^{(l)}.$$

The result is a total of M·$N_f$ delay values in the set $D_l$, that is, k∈ $D_l$. The match between the instantaneous PDP estimate and the average PDP can then be assessed by computing the correlation product:

$$c_l = \prod_{k \in D_l} b_k^{(l)} \cdot g_k^{(l)} \tag{7}$$

Sometimes a threshold event such as a rapid reduction in the correlation product occurs so that $$\frac{c_l}{c_{l-1}} < \gamma, \tag{8}$$

where γ is another system-dependent threshold parameter (that may be heuristically found). In that case, the match between the averaged and instantaneous information is degrading, most likely because of the change in the true, actual physical path structure When this happens, a path search pass can be scheduled to update a wider delay range in average PDP.

Another event that can trigger an unscheduled path search is when there are sudden drops in individual averaged path magnitudes. Such drops in averaged path magnitudes can be detected by comparing the individual path magnitude values, separated by a predetermined time interval, to each other. The time interval is preferably one that slightly exceeds the average PDP filtering time constant.

Figure 5:
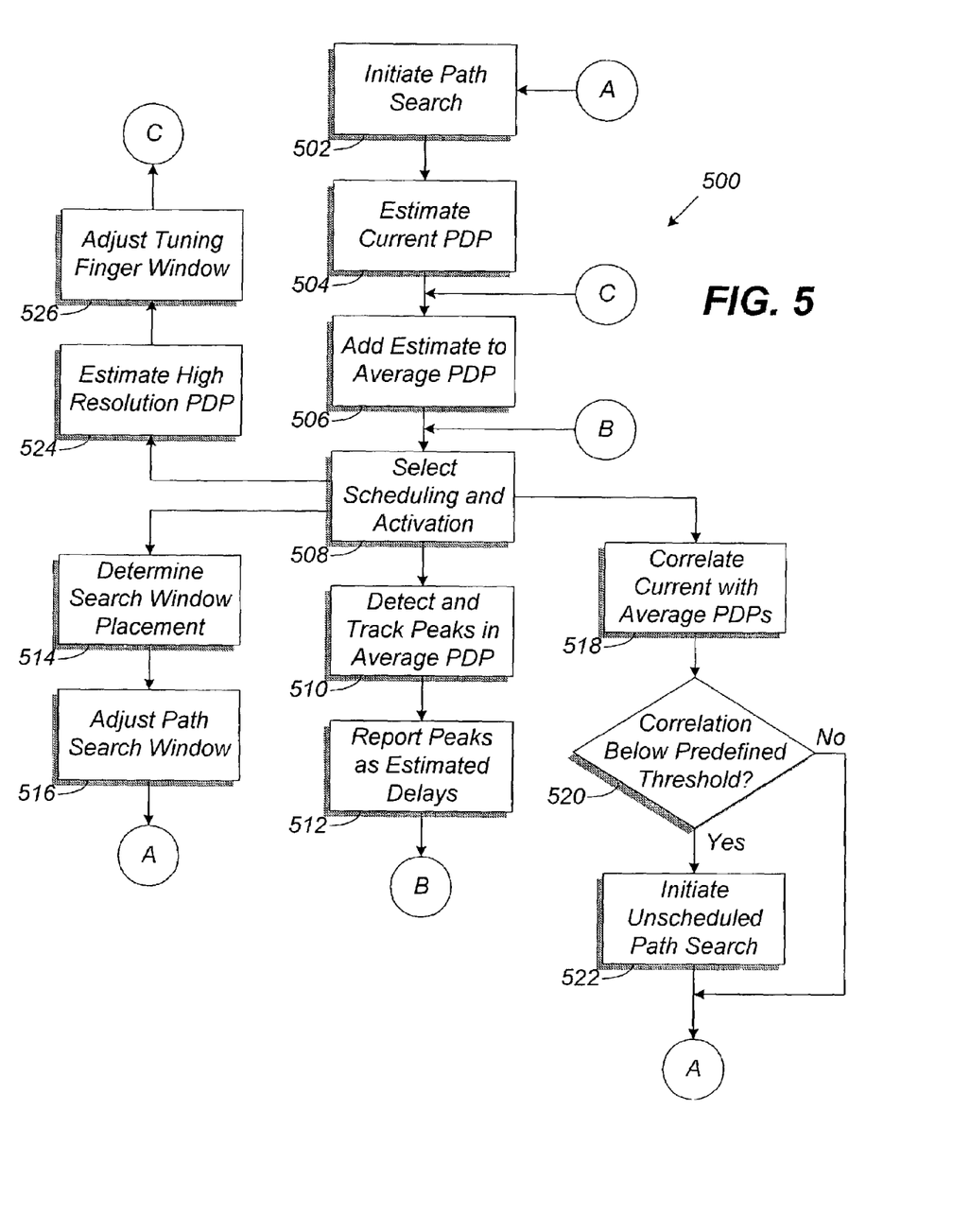
FIG. 5 illustrates a multipath delay estimation method according to embodiments of invention.

FIG. 5 illustrates an exemplary delay estimation method 500, according to some embodiments of the invention. Such a method 500 may be implemented as software, hardware, or a combination of both. At step 502, a path search is initiated for a predefined set of delays in a search window. An estimate of the current PDP is obtained at step 504. At step 506, the current PDP estimate is added to the average PDP. In some embodiments, the current PDP estimate may be added to the average PDP using an exponential averaging function. At step 508, different scheduling and activation options are selected. The different scheduling and activation options may be selected automatically based on the occurrence of some predefined event, or they may be selected according to some regular schedule. In some embodiments, the selected option involves detection of peaks in the average PDP and tracking of the same at step 510. The detected peaks are then reported as estimated delays (e.g., to a RAKE receiver) at step 512. The method then returns to the scheduling and activation selection step, at step 508

In some embodiments, determination of the search window placement is selected at step 514. The search window placement determination may be made using, for example, the center of gravity calculation or some other technique based on the average PDP at step 514. The search window placement may then be used to adjust the path search window at step 516. The method then returns to step 502 to initiate another path search pass.

In some embodiments, the scheduling and activation step 508 results in the average PDP being used with the current PDP estimate to determine a correlation therebetween at step 518. A determination is then made at step 520 as to whether the result of the correlation is below a predefined correlation threshold. If no, the method then returns to step 502 to initiate another path search pass. If yes, an unscheduled path search is initiated to update the PDP estimate. The method then returns to step 502 to initiate another regularly scheduled path searcher pass.

In some embodiments, the scheduling and activation step 508 results in the performance of a high resolution estimate for the average PDP at step 524. The high resolution PDP estimate may then be used to adjust one or more tuning finger windows at step 526. The method then returns to step 506 to add the high resolution PDP estimate to the average PDP estimate.

As demonstrated by the foregoing description, embodiments of the present invention provide a simple and robust system and method of estimating multipath delays. Advantages of the invention include long-term tracking of paths across fading, allowing more accurate interference and power estimation for each RAKE finger. In addition, paths are automatically re-discovered as they return from deep fades, without requiring a path search run to detect them. Further, in a steady-state operation, the sensitivity to path search window placement errors is significantly reduced.

The desired averaging time constant can be maintained even when the update intervals for path search and tuning finger runs are not perfectly regular. Such irregularity may be due, for example, to hardware or other resource limitations. In such a contingency, the averaging time constant can be maintained by adjusting $1-L_k$ term in Equation (1), thereby providing additional flexibility in hardware activation and real-time DSP processing. Such an adjustable averaging time constant also allows quick adaptation to changing channel conditions (change of Doppler, appearance of new paths) while the averaging is maintained.

Moreover, changes in the channel structure can be detected even when the tuning finger window positions change from one cycle to the next. Most importantly, the above advantages do not require a number of advanced signal processing algorithms tied to the various delay estimation support functions, but may be realized via a single averaging operation in the core of the delay estimation architecture.

While a limited number of embodiments have been disclosed herein, those of ordinary skill in the art will recognize that variations and modifications from the described embodiments may be derived without departing from the scope of the invention. For example, while embodiments of the invention have been described with respect to PDP estimation, the invention is not to be limited thereto and may certainly be applicable to CDP estimation. In addition, the averaging time constant may be controlled by information derived internally in the delay estimation system or by external signals, and may be the same or different for different delays. Also, the average PDP buffer may be maintained at sub-chip or chip resolution depending on the memory requirement/performance trade-off of the system. Any number of path resolving techniques, peak detection techniques, successive subtraction techniques, or comb filtering techniques known to those of ordinary skill in the art may be used. Further, the path search window placement may be based on the center of gravity, as well as the average delay or maximal magnitude delay, energy capture in the PDP, and other parameters. Finally, path search and tuning finger activation may be based on a fixed schedule, an event detection internal to the delay estimation system, or triggered by external signals. Accordingly, the appended claims are intended to cover all such variations and modifications as falling within the scope of the invention.

What is claimed is:

1. A method of estimating multipath delays for a channel in a spread spectrum based mobile communication system, the method comprising:
    defining a set of available despreading delays for the channel;
    initiating a path search of the channel using the delays to obtain channel estimates for the channel at each delay;
    compiling an instantaneous delay profile for the channel, said compiling step further comprising:
        producing correlation values for each delay profile using received symbols spanning a path searcher active period;
        applying coherent and/or non-coherent accumulation to the correlation values or to the intermediate accumulation results;
    calculating an average delay profile for the channel using the instantaneous delay profile and prior delay profiles where the path search used to produce the prior delay profiles are separated from the current path search by more than the path searcher active period; and
    detecting peaks in the average delay profile and tracking the detected peaks over time.

2. The method according to claim 1, further comprising storing information regarding the instantaneous delay profile and the average power delay profile in a buffer.

3. The method according to claim 1, further comprising correlating the instantaneous delay profile with the average delay profile, and initiating a path search based on a result of the correlation.

4. The method according to claim 1, further comprising calculating a center of gravity for the average delay profile and adjusting a position of the set of delays in time based on a result of the center of gravity calculation.

5. The method according to claim 1, further comprising initiating a tuning finger placement search on a subset of the delays based on the detected peaks.

6. The method according to claim 1, wherein the step of calculating an average delay profile includes calculating an exponential average for the delay profile.

7. The method according to claim 1, wherein the delay profile is a power delay profile.

8. The method according to claim 1, wherein the delay profile is a complex delay profile.

9. A multipath delay estimator for use in a spread spectrum based mobile communication system, comprising:
    a path searcher module adapted to obtain channel estimates for a channel at each one of a plurality of delays, the path searcher module configured to compile an instantaneous delay profile for the channel, the path searcher module further adapted to produce correlation values for each delay profile using received symbols spanning a path searcher active period; and
    apply coherent and/or non-coherent accumulation to the correlation values or to the intermediate accumulation results;
    an averaging module connected to the path searcher module, the averaging module configured to calculate an average delay profile for the channel using the instantaneous delay profile and one or more previous delay profiles where the path search used to produce the previous delay profiles are separated from the current path search by more than the path searcher active period;
    a delay profile buffer connected to the averaging module and adapted to store information regarding the instantaneous delay profile and the average delay profile; and
    a peak detector module connected to the delay profile buffer, the peak detector module configured to detect peaks in the average delay profile and to track the detected peaks over time.

10. The multipath delay estimator according to claim 9, further comprising a center of gravity module connected to the delay profile buffer and configured to calculate a center of gravity for the average delay profile and to adjust a position of the set of delays, in time, based on a result of the center of gravity calculation.

11. The multipath delay estimator according to claim 9, further comprising a correlation module connected to the delay profile buffer, the correlation module configured to correlate the instantaneous delay profile with the average delay profile, and to initiate a path search based on a result of the correlation.

12. The multipath delay estimator according to claim 11, further comprising a tuning fingers module connected to the delay profile buffer and the correlation module, the tuning fingers module configured to initiate a tuning finger placement search on a subset of the delays based on the detected peaks.

13. The multipath delay estimator according to claim 9, wherein the averaging module is configured to calculate an exponentially averaged delay profile.

14. The multipath delay estimator according to claim 9, wherein the delay profile is a power delay profile.

15. The multipath delay estimator according to claim 9, wherein the delay profile is a complex delay profile.

* * * * *